Feb. 17, 1953  F. A. WECKERLING  2,628,443
FISHING APPARATUS
Filed May 3, 1950
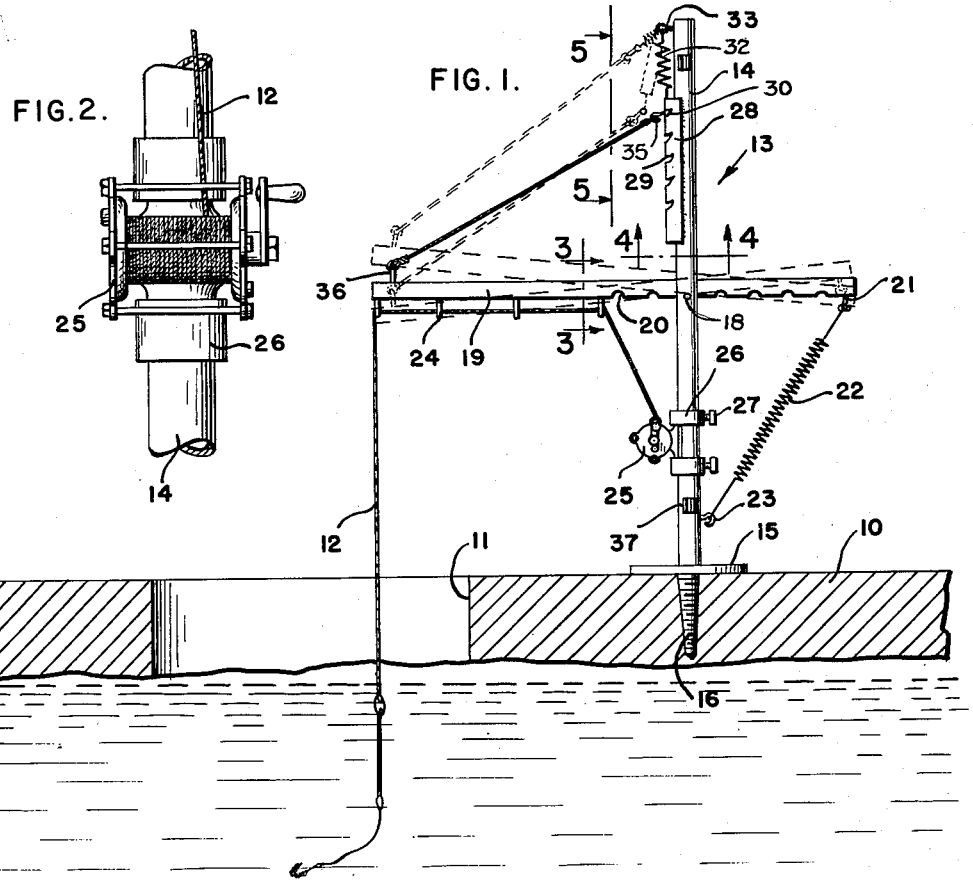
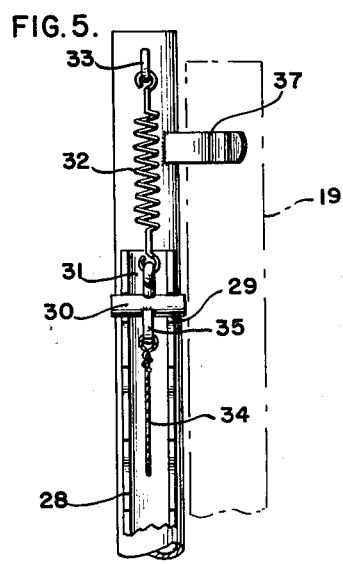
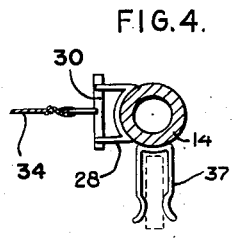
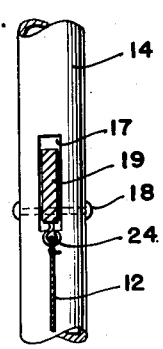
INVENTOR
FRANK A. WECKERLING
BY Patented Feb. 17, 1953

2,628,443

UNITED STATES PATENT OFFICE 2,628,443

FISHING APPARATUS

Frank A. Weckerling, Pine Island, Minn.

Application May 3, 1950, Serial No. 159,797

4 Claims. (Cl. 43—15)

The present invention relates to a fishing apparatus, and more particular has reference to an apparatus for use in ice fishing whereby the fisherman may view the fishing operations from a sheltered area in the vicinity at which the apparatus is located. While the apparatus finds particular application for use in ice fishing, it can, of course, be used along the banks of streams and the like.

An object of the present invention is to provide a fishing device of the character described wherein the fishing line is supported at a predetermined position, the fishing line support being adapted to have movement imparted thereto when the fish is nibbling or takes the bait, thus providing a visual indicator to the fisherman of that fact.

A further object of the present invention is to provide a fishing apparatus of the type hereinabove described wherein means is employed to impart a jerking movement to the hook when the fish takes the bait, thereby imbedding the hook in the fish's mouth.

Yet a further object of my invention is to provide a fishing apparatus finding especial use in ice fishing wherein means are included to regulate or adjust the degree of jerking motion which is imparted to the hook when the fish strikes the bait.

Yet another object of the present invention is to provide an ice fishing device which is relatively simple in structural details, positive and efficient in operation, and which can be easily and inexpensively manufactured.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in side elevation showing my invention in operative position relative to a hole cut through the ice, the broken lines indicating the position of the parts when the fish has struck the bait.

Figure 2 is a fragmental front elevational view showing the mode of attachment of the reel to the supporting standard.

Figure 3 is a vertical sectional view taken along the line 3—3 of Figure 1, the view looking in the direction of the arrows and being on a somewhat enlarged scale.

Figure 4 is a horizontal sectional view taken along the line 4—4 of Figure 1, the view looking in the direction of the arrows and being on a somewhat enlarged scale, and Figure 5 is a view taken along the line 5—5 of Figure 1, looking in the direction of the arrows and on a somewhat enlarged scale.

With reference to Figure 1, I have denoted a body of ice 10, 11 is an opening or hole cut in the ice to receive a fishing line 12 supported by novel fishing apparatus indicated generally 13.

The apparatus 13 comprises a standard 14 of any suitable material such as wood, metal or the like, and the standard can be of any convenient length, although I have ascertained that if this member is approximately four feet, it functions very satisfactorily.

An annular disk or plate 15, preferably of metal, is fastened or secured to the lower end of the standard 14 by welding or other attaching processes, and an externally threaded member or screw 16 is carried by and depends downwardly from the plate 15. The plate 15 gives a stable supporting base for the standard and thereby prevents tipping of the standard, while the externally threaded member 16 by being screwed into the ice will hold the standard 14 firmly in place. The standard 14 intermediate the ends thereof is formed with an elongated slot 17 in which is lodged a pivot pin 18. A lever or arm 19 which carries the line 12, to be later more fully described, is adapted to extend through the slot 17, and the lower edge of the lever is provided with a plurality of spaced apart cutaway portions or notches 20, the desired notch being adapted to rest upon the pin 18 whereby the lever may have pivotal movement about the horizontal axis relative to the standard 14. Manifestly, by disposing the proper notch 20 on the pivot pin 18, the distance which the lever projects beyond the standard 14 may be adjusted, and the stronger the water current, the shorter the distance between the lever and the standard. A securing device 21, such as a hook, is secured to the lower edge of the lever near one end thereof, and one end of a helical spring 22 is anchored to the hook while the opposite end is attached to a similar hook 23 carried by the standard 14.

A plurality of eyelets or grommets 24 are also carried by the lower edge of the lever 19, through which the line 12 is threaded, the line 12, of course, being carried by a reel 25 which is detachably connected to the standard by means of a pair of spaced collars 26 which are adjustably mounted on the standard 14. Each collar is provided with a suitable locking device 27 in order that the collars may be fastly secured to support the reel.

A channel bar or the like 28 is conveniently attached to the standard 14 at a point above the slot 17 on the same side of the standard to which the reel 25 is attached. The flanges of the channel bar are provided with spaced registering slots 29 and a transversely extending pin 30 is adapted to be selectively lodged in one of said pair of alined slots. The pin 30 carries an upper hook 31 to which the lower end of a helical spring 32 is secured, and the upper end of the spring is fixed to a hook 33 carried by the standard 14 adjacent the upper end thereof. A line, preferably of wire, 34 is attached to a hook 35 depending downwardly from the transverse pin 30 and the free end of the line is anchored to an eye or the like 36 attached to the upper edge of the arm 19, preferably near the end thereof.

A pair of spring clips 37 are attached to the standard 14 at right angles to the channel member 28 and the reel 25 in order that the wet line 12 may be wound therearound for drying purposes and, in addition, these clips serve to support the lever 19 when the apparatus is not in use, and in this regard, attention is called to Figure 5 wherein the broken lines show the position of the lever 19.

While the operation of the apparatus is believed apparent from the foregoing, it may be briefly summarized as follows:

After the standard 14 is positioned adjacent the hole 11, the lever 19 is then inserted through the slot 17 and the desired notch is disposed upon the pin 18. The upper end of the spring 22 is attached to the hook 21, and the line 12 is threaded through the eyelets 24. The transverse pin 30 is then engaged with the necessary slots 29 and the baited line 12 lowered through the hole 11. When the fish takes the bait, the pressure on the line 12 will move the lever 19 downwardly about its pivot which will release the pin 30 from the slots 29, whereupon the spring 32, by virtue of its connection to the lever 19 by the line 34, will jerk the lever 19 upwardly about the pin 18, thus imbedding the hook in the fish's mouth. Obviously, if the pin 30 is lodged in the lowermost slot 29, the spring 32 will be greatly extended and the upward jerking movement will be extremely great. On the other hand, lodgment of the pin 30 in the uppermost notches will impart a relatively slight jerking movement to the lever. Hence, it can be seen that I have provided a very simple means for regulating the desired degree of jerking motion to be imparted to the lever.

It is believed apparent, therefore, that I have provided a relatively simple fishing appliance which can be quickly and easily assembled or disassembled and which will enable the fisherman to readily ascertain when the fish is biting on the line and at the same time effectively aid in imbedding or lodging the hook in the fish's mouth. Furthermore, by the use of the reel 25, it is unnecessary to lay the wet line in the snow or ice, which is most undesirable in fishing during extremely cold weather conditions.

The invention is not to be confined to any strict conformity with the showing in the drawing, but may be changed or modified so long as such changes or modifications mark no material departure from the salient features of the invention as expressed in the appended claims.

I claim:

1. In a fishing apparatus of the character described, a vertical standard adapted to be supported in proximity to the fishing area, an arm pivotally mounted on the standard for movement about a horizontal axis with respect to the standard, spring means operatively connecting one end of the arm to the standard to normally urge the other end of the arm upwardly about the pivotal mounting, a reel supported by the standard and having a fishing line wound thereon, means carried by the arm for slidably supporting the fishing line relative to the arm, a notched member secured to said standard above the arm, a pin adapted to be lodged in one of said notches, spring means connected with the standard above said notched member and with said pin, and a connection between the pin and said other end of the arm whereby downward movement of the arm will dislodge the pin from the notches whereupon said last named spring means will impart an upward pivotal movement to the arm.

2. In a fishing apparatus of the character described, a vertical standard adapted to be supported in proximity to the fishing area, an arm pivotally connected intermediate its ends to the standard for movement about a horizontal axis with respect to the standard, spring means operatively connected to one end of said arm and to the standard at a point below said arm for normally urging the other end of the arm upwardly about the pivot, a reel supported by the standard, said reel having a fishing line wound thereon a portion of which is slidably supported by the arm, a notched element mounted on said standard above said arm, a pin adapted to be lodged in said notched element, spring means connected at one end with said standard at a point above the notched element and connected at the opposite end to said pin, and a flexible connection between the pin and the free end of the arm whereby downward movement of the other end of the arm about its pivot will dislodge the pin from the notched element whereupon the last named spring means will impart an upward pivotal movement to the arm.

3. In a fishing apparatus of the character described, a vertical standard adapted to be supported in proximity to the fishing area, said standard having a slot therein intermediate the ends thereof, a pivot pin disposed across the slot, an arm adapted to extend through the slot and provided with at least one notch therein adapted to rest on the pin whereby the arm may have pivotal movement about a horizontal axis relative to the standard, a reel supported by the standard and having a fishing line wound thereon, spring means operatively connected to one end of the arm and the standard for normally urging the other end of said arm upwardly about its pivot, means carried by said arm for slidably supporting the fishing line, a notched member secured to the standard above said arm, a pin adapted to be lodged in one of said notches, spring means connected to the standard above said notched member and with said last named pin, and a connection between said last named pin and said other end of the arm whereby downward movement of said other end of the arm will dislodge the pin from the notches whereupon the last named spring means will impart upward pivotal movement to the arm.

4. A fishing apparatus as claimed in claim 3 wherein the arm is provided with a plurality of spaced notches whereby the point of pivoting of the arm can be adjusted.

FRANK A. WECKERLING.

REFERENCES CITED

The following references are of record in the file of this patent:

UNITED STATES PATENTS

| Number | Name | Date |
|---|---|---|
| 202,818 | Hesse | Apr. 23, 1878 |
| 422,331 | Bradford | Feb. 25, 1890 |
| 467,121 | Kunzel | Jan. 12, 1892 |
| 1,549,405 | Bjurstrom | Aug. 11, 1925 |
| 1,937,972 | Madden | Dec. 5, 1933 |